(12) United States Patent
Izumi

(10) Patent No.: US 6,233,227 B1
(45) Date of Patent: May 15, 2001

(54) TRANSMITTING AND RECEIVING APPARATUS

(75) Inventor: Shinobu Izumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/903,287

(22) Filed: Jul. 30, 1997

(30) Foreign Application Priority Data

Aug. 5, 1996 (JP) .................................................. 8-206174

(51) Int. Cl.[7] .................................. H04B 1/56; H04L 5/14
(52) U.S. Cl. .......................................................... 370/280
(58) Field of Search .................................. 370/276, 280, 370/319, 516, 517, 345; 455/69, 86; 375/219

(56) References Cited

U.S. PATENT DOCUMENTS

| | | | |
|---|---|---|---|
| 5,267,233 | * 11/1993 | Bauerschmidt | 370/345 |
| 5,309,429 | * 5/1994 | Fukuda | 370/29 |
| 5,339,309 | * 8/1994 | Saito | 370/29 |
| 5,442,653 | * 8/1995 | Saito | 375/219 |
| 5,511,090 | * 4/1996 | Denton et al. | 370/342 |
| 5,657,344 | * 8/1997 | Na | 370/280 |
| 5,802,110 | * 9/1998 | Watanabe et al. | 455/69 |
| 5,819,161 | * 10/1998 | Saito | 455/86 |

FOREIGN PATENT DOCUMENTS

| | | | |
|---|---|---|---|
| 4281636 | * 7/1992 | (JP) | H04L/5/16 |
| 4257126 | * 9/1992 | (JP) | H04B/1/56 |
| 5183468 | * 7/1993 | (JP) | H04B/1/54 |
| 5183595 | * 7/1993 | (JP) | H04L/27/36 |
| 8149164 | * 7/1996 | (JP) | H04L/27/12 |

\* cited by examiner

Primary Examiner—Min Jung
(74) Attorney, Agent, or Firm—Jay H. Maioli

(57) ABSTRACT

A high frequency circuit for a single superheterodyne receiving system in FDMA/TDD transmitting and receiving apparatus can be arranged so as to satisfy standards for spurious signals. The high frequency circuit block includes a receiving system and a transmitting system. A reception enable signal is supplied to the receiving system and a transmission enable signal is supplied to the transmitting system, so that a receiving channel and a transmitting channel are alternately switched. The transmission enable signal is supplied to the transmitting system via a rise delay circuit. The rise delay circuit is provided at an input side of the driver amplifier of the transmitting system.

6 Claims, 7 Drawing Sheets

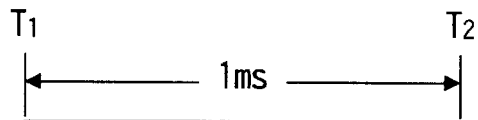
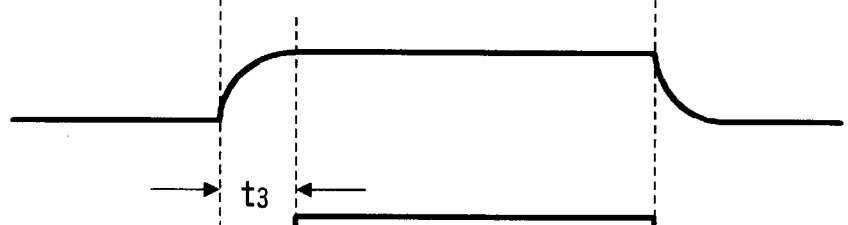
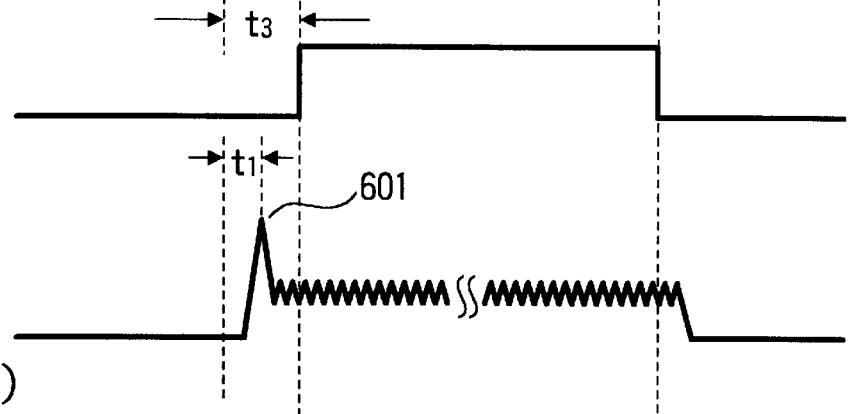

TRANSMITTING AND RECEIVING APPARATUS

BACKGROUND OF THE INVENTION

1. Field of the Invention

The present invention relates to a transmitting and receiving apparatus which uses a frequency division multiple access (FDMA) system for a multiple access system and a time division duplex (TDD) system for a bidirectional communication system. Particularly, it relates to a high frequency circuit block of a mobile station (hand set) or a base station (base unit) in that system.

2. Description of the Related Art

A transmitting and receiving apparatus such as a digital cordless telephone or the like employing a CT-2 system which is widely adopted in Europe, etc. uses the FDMA system for the multiple access system and uses the TDD system for the duplex system.

A system for connecting to a specified destination of communication in a communication space which is simultaneously utilized by a plurality of users is called multiple access. The CT-2 system employs the FDMA system for the multiple access. In the FDMA system, one frequency is allocated to each user.

The CT-2 system employs the TDD system (one-frequency time-division bidirectional communication system) as a system for separating a channel (reception channel) from a base station (base unit) to a mobile station (hand set) and a channel (transmission channel) from a mobile station (hand set) to a base station (base unit).

The TDD is a system in which the same frequency is used alternately for transmission and reception in a time division fashion. For example, transmission and reception both using a carrier signal in one frequency band are alternatively switched at every one millisecond.

Since it has been difficult to form a band-pass filter having a sharp cut-off characteristic in a high-frequency circuit block of a mobile station (hand set) of a FDMA/TDD transmitting and receiving apparatus, the transmitting and receiving apparatus has required a double superheterodyne reception system.

SUMMARY OF THE INVENTION

In view of such aspects, it is an object of the present invention to provide an FDMA/TDD transmitting and receiving apparatus which employs a single superheterodyne reception system in a high-frequency circuit block.

More specifically, it is an object of the present invention to provide an FDMA/TDD transmitting and receiving apparatus employing a single superheterodyne reception system which satisfies a standard with respect to spurious emission.

According to an aspect of the present invention, a transmitting and receiving apparatus employing an FDMA system as a multiple access system and employing a TDD system as a bidirectional communication system includes a receiving means for generating a reception data from a reception signal received by an antenna at a timing based on a reception enable signal, an intermediate frequency transmission signal generating means for generating a transmission signal having an intermediate frequency at a timing based on a transmission enable signal having a phase reverse to that of the reception enable signal, a frequency converting means for the transmission signal having the intermediate frequency into a transmission signal having a transmission frequency, a delay means for delaying the transmission enable signal, a signal processing means for subjecting the transmission signal having the transmission frequency to a predetermined signal processing at a timing based on an output from the delay means, and a supply means for supplying an output from the signal processing means to the antenna.

BRIEF DESCRIPTION OF THE DRAWINGS

FIGS. 3A to 3E are timing charts of the high frequency circuit in a mobile station of the transmitting and receiving apparatus according to the present invention;

DETAILED DESCRIPTION OF THE PREFERRED EMBODIMENTS

Before the detailed description of the present invention a simple application of a single superheterodyne reception system high-frequency circuit block to an FDMA/TDD system digital cordless telephone system will be described.

Figure 4:
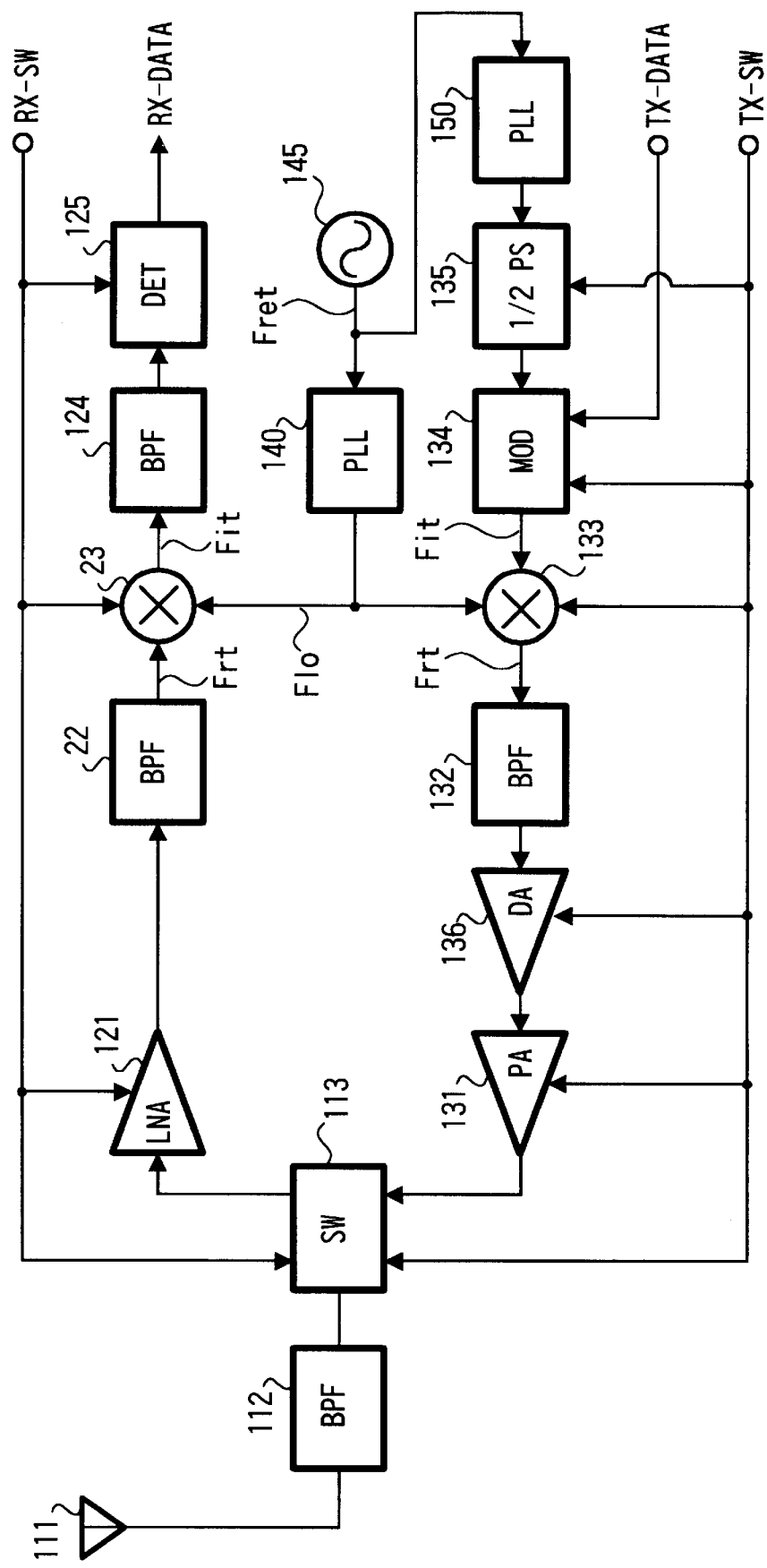
FIG. 4 is a diagram showing a high frequency circuit block in a mobile station of a transmitting and receiving apparatus related to the present invention.

FIG. 4 shows a high-frequency circuit block of a FDMA/TDD system digital cordless telephone system to which the single superheterodyne reception system is applied.

This digital cordless telephone system employs the FDMA/TDD system. Accordingly, a carrier wave signal of the same transmitting/receiving frequency Frf is used for both of a transmission channel and a reception channel, and both of the transmission and reception channels are switched alternatively every one millisecond.

Generally, the high-frequency circuit block has an antenna system formed of circuit parts 111, 112, 113, a receiving system formed of circuit parts 121, 122, 123, 124, 125, a transmitting system formed of circuit parts 131, 132, 133, 134, 135, 136 and an oscillator circuit system formed of circuit parts 140, 145, 150.

The oscillator circuit system will be first described This oscillator circuit system has a reference oscillator 145 and two phase-locked loop (PLL) circuits 140, 150. A signal having a reference frequency Fref is supplied from the reference oscillator 145 to the first and second PLL circuit 140 and 150.

The first PLL circuit 140 generates a signal having a local oscillation frequency Flo and the second PML circuit 150 generates a signal having a frequency which is twice as high as an intermediate frequency Fif.

For example, the reference frequency Fref is set to 12.8 MHz, the local oscillation frequency Flo is set to 846 MHz, and the frequency which is twice as high as the intermediate frequency Fif is set to 2×20 MHz=40 MHz.

The receiving channel will be described subsequently. A carrier signal having the transmission and reception frequency Frf received by an antenna 111 is supplied to a frequency converter (mixer) 123 through a first band-pass filter 112, a transmission/receptions changeover switch 113, a low noise amplifier 121 and a second band pass filter 122.

The frequency converter 123 generates a received signal having the intermediate frequency Fif from the carrier signal of the transmission/reception frequency Frf supplied thereto from the second band pass filter 122 and the signal having the local oscillation frequency Flo supplied thereto from the first PLL circuit 140.

For example, assuming that the transmission/reception frequency Frf is 866 MHz and the local oscillation frequency Flo is 846 MHz, then the intermediate frequency Fif is 20 MHz.

The carrier signal having the intermediate frequency Fif is supplied to a demodulator 125 via a third band-pass filter 124. The demodulator 125 generates a received data RX-DATA.

The transmitting channel will be described subsequently. The second PLL circuit 150 generates the signal having a frequency which is twice as high as the intermediate frequency Fif. The reason why the second PLL circuit 150 generates the signal having not the intermediate frequency Fif but the frequency which is twice as high as the intermediate frequency Fif is as follows. Since a voltage controlled oscillator (VCO) included in the PLL circuit 150 starts working a time when a power supply is turned on, the power supply is always kept in a turned on state. Accordingly, the power supply for the voltage controlled oscillator (VCO) is kept in its on-state even upon reception. Therefore, if the second PLL circuit 150 outputs a signal having the intermediate frequency Fif, the signal will interfere with the reception.

The signal having the frequency 2×Fif output from the second PLL circuit 150 is frequency-divided by a half by a ½ prescaler 135 to produce a signal having the intermediate frequency Fif. A modulator 134 is input with the carrier signal having the intermediate frequency Fif supplied from the ½ prescaler 135 and a data transmission TX-DATA to generate a transmission signal having the intermediate frequency Fif. This signal is supplied to a frequency converter (mixer) 133.

The frequency converter 133 generates a carrier signal having the transmission/reception frequency Frf from the carrier signal having the intermediate frequency Fif supplied by the ½ prescaler 135 and the signal having the local oscillation frequency Flo supplied from, the first PLL circuit 140.

In the above example, since the local oscillating frequency Flo is 846 MHz and the intermediate frequency Fif is 20 MHz, the transmission/reception frequency Frf is 866 MHz.

The carrier signal having the transmission/reception frequency Frf supplied from the frequency converter 133 is supplied to the antenna 111 via a fourth band pass filter 132, a driver amplifier 136, a power amplifier 131, the transmission and reception changeover switch 113, and the first band pass filter 112. Then the carrier the signal is transmitted from the antenna 111.

Finally, how to switch the reception channel and the transmission channel will be described. The reception channel and the transmission channel are alternately switched, for example, every 1 millisecond. The receiving system is supplied with a reception enable signal RX-SW. For example, this reception enable signal RW-SW is supplied to the transmission and reception changeover switch 113, the low noise amplifier 121, the frequency converter 123 and the modulator 125. Similarly, the transmission system is supplied with a transmission enable signal TX-SW.

This transmission enable signal TX-SW is supplied to the transmission and reception changeover switch 113, the power amplifier 131, the driver amplifier 136, the frequency converter 133, the modulator 134 and the ½ prescaler 135. In response to the reception enable signal RX-SW and the transmission enable signal TX-SW, those circuits in the reception system are simultaneously turned on or off and these circuits in the transmission system are simultaneously turned on or off with polarities from each other.

Although it can be considered that a double superheterodyne reception system is employed, the double superheterodyne reception system has a drawback of large power consumption and high manufacturing expense. In order to avoid this drawback, employment of the single superheterodyne reception system is considered. However, the single superheterodyne reception system encounters a problem of a spurious emission in the transmission system as described below.

When the single superheterodyne reception system is employed, it is necessary to set a value of the intermediate frequency Fif to a lower value as compared with that of the double superheterodyne reception system. Accordingly, a higher harmonic component of the transmission enable signal TX-SW may be included in the intermediate frequency region of the transmitting system as a spurious signal. As a result, spurious signals will be output from the antenna.

Figure 5:
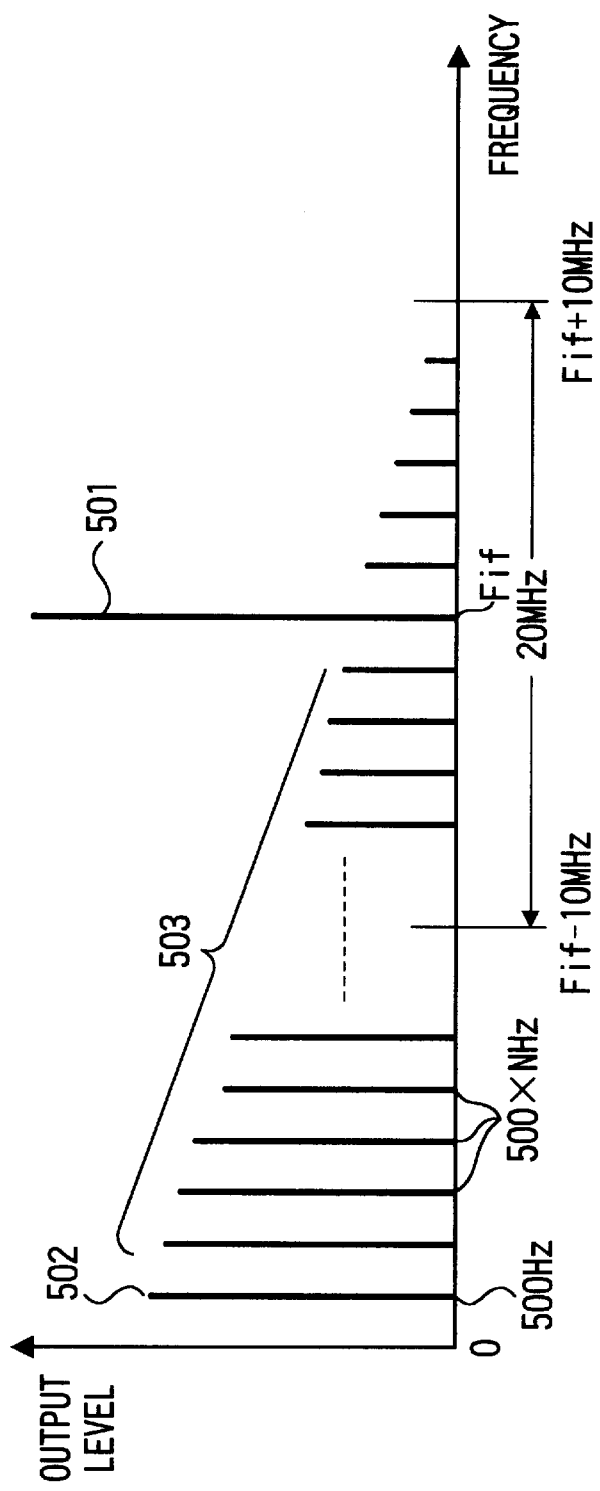
FIG. 5 is a graph showing a frequency spectrum of a signal output from a modulator in the high frequency circuit of the transmitting and receiving apparatus related to the present invention.

How spurious signals are output will be fully described with reference to FIG. 5 and FIGS. 6A to 6D. FIG. 5 shows a frequency spectrum of a signal output from the modulator 134 in the transmitting system, wherein the vertical axis represents an output level and the horizontal axis represents a frequency. The modulator 134 outputs the transmission signal having the intermediate frequency Fif of 20 MHz. In FIG. 5, a fundamental wave 501 at a frequency 20 MHz represents the transmission signal having the intermediate frequency Fif.

On the other hand, it is assumed that each of the reception enable signal RX-SW and the transmission enable signal TX-SW, for example, is a rectangular wave signal having a frequency of 500 MHz which varies between a high level and a low level for every 1 millisecond. As shown in FIG. 5, the signal output from the modulator 134 includes spurious signals 503 resulting from the transmission enable signal 502 having the frequency of 500 Hz.

However, these spurious signals 503 each appear at a frequency "500×N" Hz (N=1, 2, 3, . . . ), and the output levels thereof decrease as the frequency increases as illustrated in FIG. 5.

However, since a value of the intermediate frequency Fif is set to a relatively low (Fif=20 MHz) in the single superheterodyne receiving system, the spurious signals exist even in the intermediate frequency region.

The output signal of the modulator 134 is supplied to the transmission frequency converter 133 to generate the signal of the transmitting/receiving frequency Frf=866 MHz. A frequency spectrum of the output signal of frequency converter 133 will become similar to that of the output signal of the modulator 134 shown in FIG. 5. The output signal of the transmission frequency converter 133 is supplied to the fourth band pass filter 132.

It is assumed that a pass band of the fourth band pass filter 132 has a bandwidth of 20 MHz as illustrated in FIG. 5. The fourth band pass filter 132 causes signals within a frequency range Frf±10 MHz=866 MHz±10 MHz to pass therethrough. Therefore, spurious signals included in this range of the output signal of the modulator 134 will be output from the antenna 111 via the fourth band pass filter 132.

Figure 6:
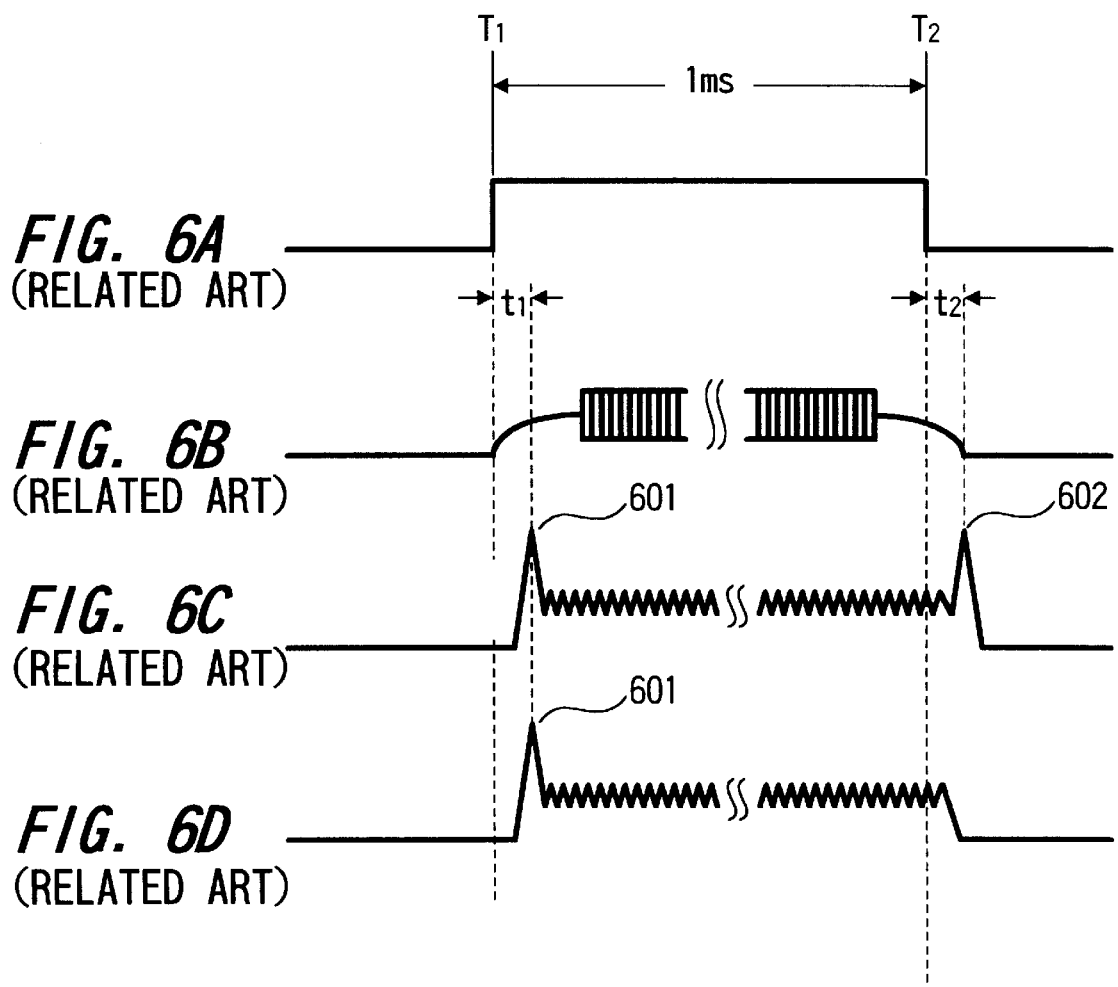
FIGS. 6A to 6D are timing charts of the high frequency circuit in the mobile station of the transmitting and receiving apparatus related to the present invention.

Referring to FIGS. 6A to 6D, a mode of the spurious signals included in the output signal of the modulator 134 will be described. FIG. 6A shows a wave form of the transmission enable signal TX-SW, which varies between a high level and a low level for every 1 millisecond with a period of 2 millisecond or a rectangular wave form signal of a frequency of 500 Hz. FIG. 6B shows the output signal of the modulator 134 FIG. 6C shows a waveform which is obtained by analyzing a component of, for example, 15 MHz of the output signal from the modulation 134 through a spectrum analyzer not shown. FIG. 6D shows a waveform which is obtained by analyzing a component of, for example, 15 MHz of the output signal of the frequency converter 133 through a spectrum analyzer similar to FIG. 6C.

As shown in FIG. 6A, the transmission enable signal TX-SW is assumed to rise to a high level at a time point $T_1$ and fall to a low level at a tine point $T_2$ after a duration of 1 millisecond. The output signal of the modulator 134 rises with a delay of a time period $t_1$ relative to the time point $T_1$ and falls with a delay of a time period $t_2$ relative to the time point $T_2$ as shown in FIG. 6B.

As is illustrated in FIG. 6C, spurious signals 601 and 602 included in the output signal of the modulator 134 rise up at a rising time point $T_1+t_1$ and a falling time point $T_2+t_2$ of the output signal of the modulator 134, respectively. The output signal of the modulator 134 including these spurious signals 601 and 602 is output to the frequency converter 133.

The output of the frequency converter 133 is controlled by the transmission enable signal TX-SW shown in FIG. 6A. The frequency converter 133 will receive the output signal of the modulator 134 but outputs only a signal thereof which is input for 1 millisecond from the time point $T_1$ to the time point $T_2$. Accordingly, of those spurious signals included in the output signal of the modulator 134, the spurious signal at the rising time point $T_1+t_1$ will be output form the frequency converter 133, but the spurious signal at the falling time point $T_2+t_2$ is not output from the frequency converter 133.

Then, the output signal of the frequency converter 133 is output from the antenna 111 via the band pass filter 132. However, because the spurious signal at the rising time point $T_1+t_1$ can not be removed, it cannot satisfy a standard, I-ETS-300-131 with respect to a spurious emission of, for example, an ETSI (European Telecommunication standard Institute).

In view of the foregoing, an object of the present invention is to solve the problem in which, since the value of the intermediate frequency Fif is set relatively low (e.g. Fif=20 MHz) in the single superheterodyne receiving system, the spurious signal 503 caused by the transmission enable signal 502 will pass the band pass filter 132 to be output form the antenna.

Figure 1:
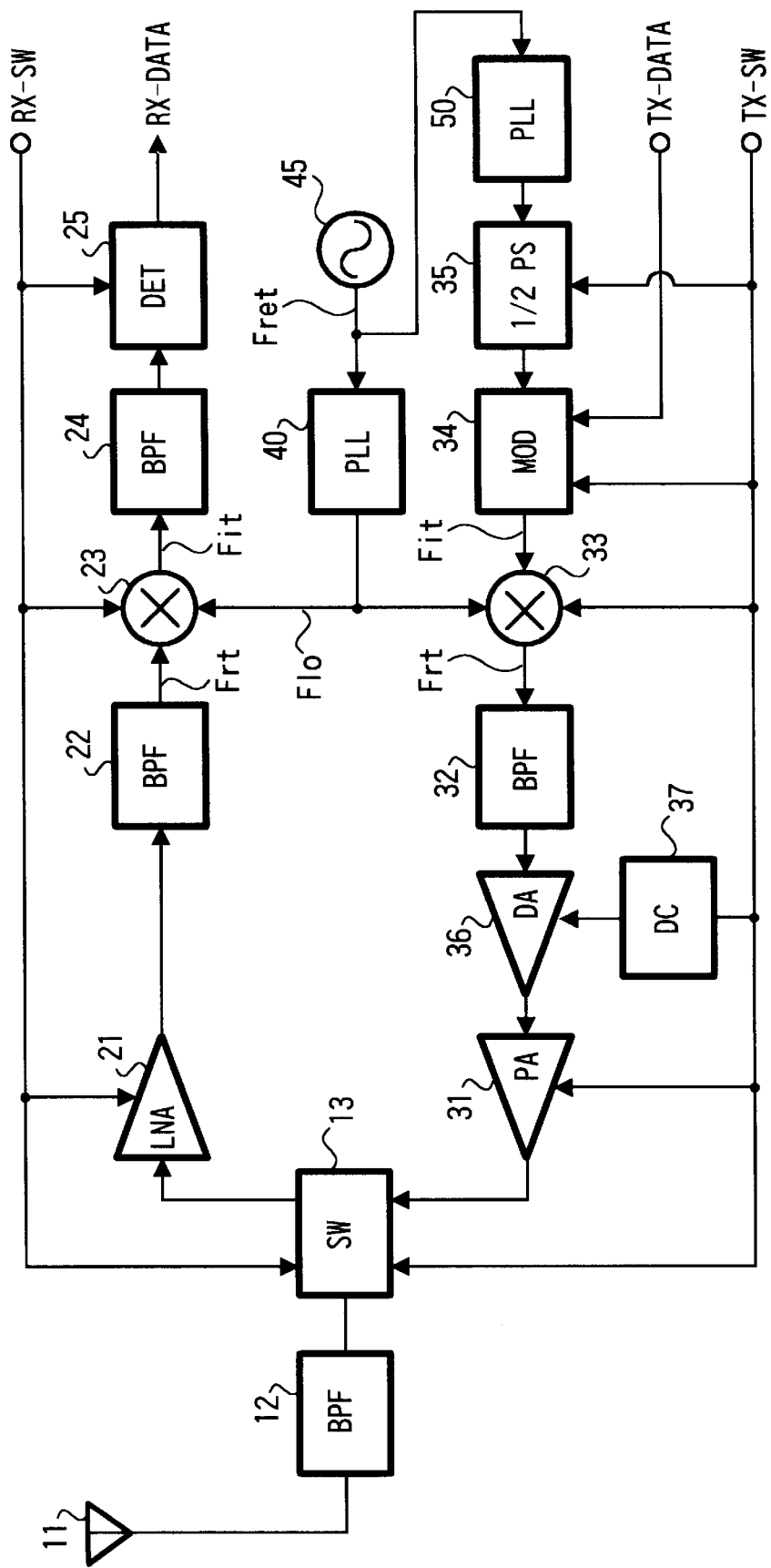
FIG. 1 is a block diagram showing an embodiment of a transmitting and receiving apparatus according to the present invention by way of example.

Referring to FIG. 1, a configuration of a mobile station (slave) of a digital cordless telephone system according to the present invention, particularly an example of the high frequency circuit block thereof will be described below. This digital cordless telephone system is the FDMA/TDD system. Thus, a transmitting channel and a receiving channel use a carrier wave signal of the same transmitting/receiving frequency Frf and both channels are switched alternatively every 1 one millisecond. The present example of the high frequency circuit block adopts a single superheterodyne receiving system. Further, such a high frequency circuit is also used in the base station (master).

Generally, the high frequency circuit block comprises an antenna system 11, 12, 13, a receiving system 21, 22, 23, 24, 25, a transmitting system 31, 32, 33, 34, 35, 36 and an oscillator circuit system 40, 45, 50.

First of all, the oscillator circuit system will be described. The present example of the oscillator circuit system comprises a reference oscillator 45 and two phase-locked loop circuits (PLL circuits) 40, 50. The reference oscillator 45 is a temperature compensated crystal oscillator which generates a reference signal having a reference frequency Fref. The signal of the reference frequency Fref output by the reference oscillator 45 is supplied to the first and second PLL circuits 40 and 50.

The first PLL circuit 40 generates a signal having a local oscillating frequency Flo and the second PLL circuit 50 generates a signal having a frequency 2×Fif which is two times an intermediate frequency Fif.

For example the reference frequency. Fref is set to 12.8 MHz, the local oscillating frequency Flo is set to 846 MHz, and the frequency two times the intermediate frequency Fif is set to 2×20 MHz=40 MHz, respectively.

Next, the receiving channel will be described. A carrier wave signal of the transmitting/receiving frequency Frf received by the antenna 11 is supplied to a reception frequency converter (mixer) 23 via a first bans pass filter 12, a switch 13 for changing between transmission and reception, a low noise amplifier (LNA) 21 and a second band pass filter 22.

The reception frequency converter 23 receives the carrier wave signal of the transmitting/receiving frequency Frf supplied from the second band pass filter 22 and the signal of the local oscillating frequency Flo supplied from the first PLL circuit 40 as inputs to generate a received signal of the intermediate frequency Fif.

For example, assuming that the transmitting/receiving frequency Frf is 866 MHz and the local oscillating frequency Flo is 846 MHz, then the intermediate frequency Fif will be 20 MHz.

The carrier signal of the intermediate frequency Fif is supplied to a demodulator 25 via a third band pass filter 24 and a received data RX-DATA is generated by the demodulator 25.

Next, the transmitting channel will be described. The signal of a frequency tow times the intermediate frequency Fif is generated by the second PLL circuit 50.

The signal of the frequency 2×Fif output by the second PLL circuit 50 is frequency-divided into half by a ½ prescaler 35 to produce a signal of the intermediate frequency Fif. A modulator 34 receives the carrier wave signal of the intermediate frequency Fif supplied by the ½ prescaler 35 and the data transmission TX-DATA as inputs to generate a signal for transmission of the intermediate frequency Fif. This signal is supplied to a frequency converter (mixer) 33.

The frequency converter 33 receives the carrier wave signal of the intermediate frequency Fif supplied by the ½ prescaler 35 and the signal of the local oscillating frequency Flo supplied by the first PLL circuit 40 as inputs to generate a carrier wave signal of the transmitting/receiving frequency Frf.

In the above embodiment, since the local oscillating frequency Flo is 846 MHz and the intermediate frequency Fif is 20 MHz, the transmitting/receiving frequency Frf will be 866 MHz.

The carrier wave signal of the transmitting/receiving frequency Frf from the frequency converter 33 is supplied to the antenna 11 via a fourth band pass filter 32, a driver amplifier 36, a power amplifier 31, the changing between transmission and reception switch 13 and the first band pass filter 12 so as to be transmitted from the antenna 11.

Next, the switching between the receiving channel and the transmitting channel will be described. The receiving channel and the transmitting channel are alternately switched, for example, every 1 millisecond. To the receiving system a reception enable signal RX-SW is supplied. For example, this reception enable signal RW-SW is supplied to the switch 13 for changing transmission and reception, the low noise amplifier 21, the frequency converter 23 and the modulator 25. Similarly, to the transmission system, a transmission enable signal TX-SW is supplied.

This transmission enable signal TX-SW is supplied to the changing transmission and reception switch 13, the power amplifier 31, a delay circuit 37, the frequency converter 33, the modulator 34 and the ½ prescaler 35. In this example, an output from the delay circuit 37 is supplied to the driver amplifier 36.

Figure 2:
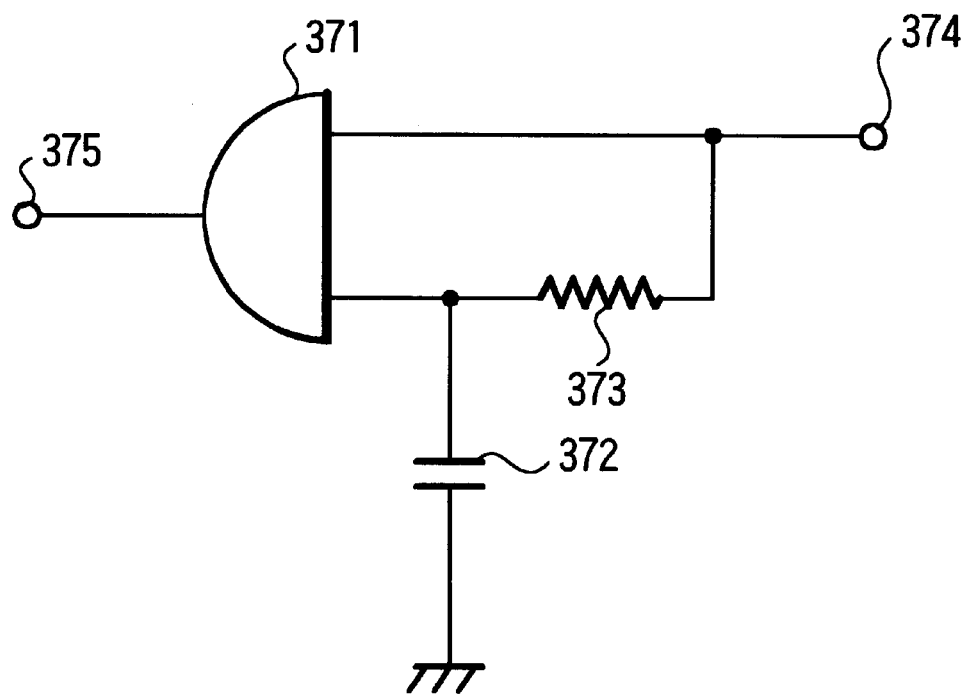
FIG. 2 is a circuit diagram showing an example of the delay circuit according to the present invention.

FIG. 2 shows an example of a construction of the delay circuit 37. The present example of the delay circuit 37 includes an AND circuit 371 and a RC delay circuit or a capacitor 372 and a resistor 373. The transmission enable signal TX-SW is supplied to an input terminal 374 of this delay circuit 37 and the signal from an output terminal 375 is supplied to the driver amplifier 36.

Referring to FIGS. 3A to 3D, the operation to remove the spurious signal will be described. FIG. 3A shows, similarly to FIG. 6A, the wave form of the transmission enable signal TX-SW, which is, a rectangular wave signal with a period of 2 millisecond and a frequency of 500 H, and which varies between a high level and a low level for every 1 millisecond. The transmission enable signal TX-SW of FIG. 3A is an input signal to one of two inputs of the AND circuit 371 of FIG. 2. FIG. 3B shows another input signal to the other input of the AND circuit 371 of FIG. 2, specifically a signal passed through the RC delay circuit or the capacitor 372 and the resistor 373.

FIG. 3C shows an output signal of the AND circuit 371 of FIG. 2 and hence the output signal of the delay circuit 37. This output signal of the AND circuit 371 represents a result of AND operation of the two input signals (FIG. 3A and FIG. 3B). As FIG. 3C shows, the output signal of the AND circuit 371 rises to a high level at a time point $T_1+t_3$ and falls to a low level at a time point $T_2$.

As will be apparent by comparison between FIG. 3A and FIG. 3C, according to the present example, the output signal of the delay circuit 37 is such that only the rising time at which the transmission enable signal TX-SW rises up from a low level to a high level is delayed by a time period $t_3$. It is necessary that this delay time period $t_3$ to be greater than the time period $t_1$ during which the rising spurious signal 601 occurs (See FIG. 6B). For example, the delay time period $t_3$ is set to be 3 milliseconds.

Thus, the following condition is satisfied.

$$t_3 > t_1$$

The output signal from the AND circuit 371 shown in FIG. 3C, namely the output signal of the delay circuit 37 is supplied to the driver amplifier 36. Thus, the driver amplifier 36 is controlled by the rectangular wave signal which rises to a high level at the time point $T_1+t_3$ and falls to a low level at the time point $T_2$ shown in FIG. 3C rather than the transmission enable signal TX-SW of FIG. 3A.

FIG. 3D is a diagram showing a waveform which is obtained by analyzing a component of, for example, 15 MHz in the output signal from the frequency converter 33 through a spectrum analyzer, not shown. FIG. 3E shows a wave form which is obtained by analyzing a component of, for example 15 MHz in the output signal from the driver amplifier 36 through a spectrum analyzer, not shown. The driver amplifier 36 receives as an input the output signal of the frequency converter 33, but the driver amplifier 36 outputs only a signal which is input for a time period $(1-t_3)$ millisecond from the time point $T_1+t_3$ to the time point $T_2$. Therefore, the spurious signal 601 contained in the output signal of the frequency converter 33 is removed. After all, the signal without the spurious signal is output from the driver amplifier 36.

The output signal of the driver amplifier 36 is output from the antenna 11 via the power amplifier 31 and changing between transmission and reception the switch 13. This signal contains almost no spurious signal and so it can meet the standards relating to the spurious signal.

Figure 7:
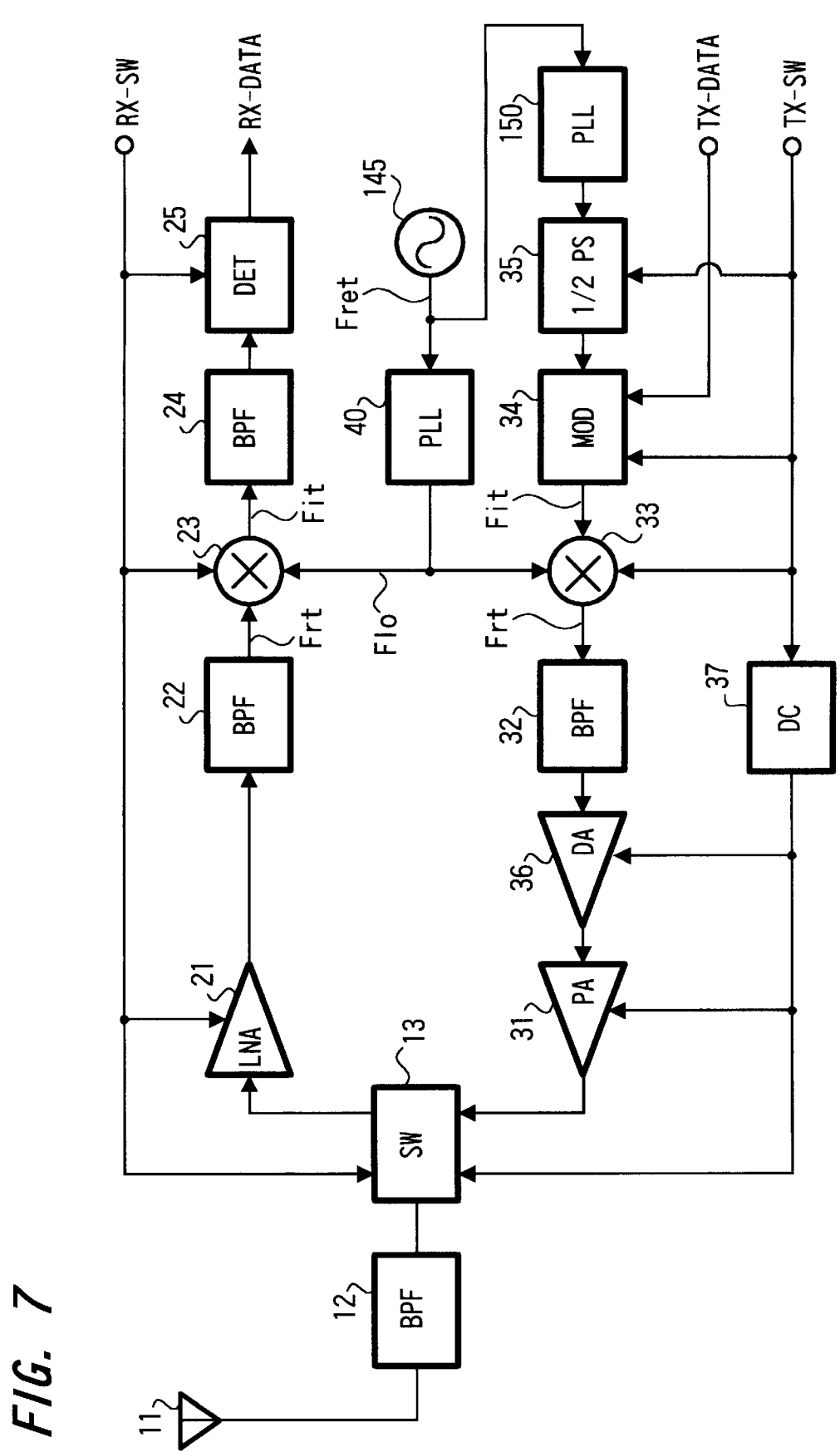
FIG. 7 is a block diagram showing a transmitting and receiving apparatus according to another embodiment of the present invention.

FIG. 7 is a diagram showing a transmitting and receiving apparatus according to another embodiment of the present invention. The transmitting and receiving apparatus shown in FIG. 7 is different from that shown in FIG. 1 in that a transmission enable signal TX-SW delayed by a delay circuit 37 is supplied to a driver amplifier 36, a power amplifier 31 and a transmission/reception changeover switch 13. In FIG. 7, other parts and units corresponding to those shown in FIG. 1 are marked with the same reference numerals and hence need not to be described in detail.

According to the present invention, even if the intermediate frequency is set comparatively low by adopting the single superheterodyne receiving system in the high frequency circuit block of the FDMA/TDD transmitting and receiving apparatus, since the problem in which the higher harmonics component of the transmission enable signal has reached the intermediate frequency, thereby causing the undesired spurious signals to be emitted from the antenna is eliminated, the advantage can be obtained, in which the spurious standards can be satisfied even if the single superheterodyne receiving system is adopted.

According to the present invention, an advantage can be obtained, in which it is possible to reduce the cost of manufacture, the current consumption and the cost of materials of the high frequency circuit block in the FDMA/TDD transmitting and receiving apparatus.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A transmitting and receiving apparatus employing an FDMA system as a multiple access system and a TDD system as a bidirectional communication system, comprising:

receiving means for generating reception data from a reception signal received by an antenna at a timing based on a reception enable signal;

intermediate frequency transmission signal generating means for generating a transmission signal having an intermediate frequency at a timing based on a transmission enable signal having an inverted phase compared to a phase of the reception enable signal;

frequency converting means for converting said transmission signal having the intermediate frequency into a transmission signal having a transmission frequency;

delay means for delaying said transmission enable signal;

signal processing means for processing said transmission signal having the transmission frequency according to a predetermined signal processing at a timing based on an output from said delay means; and supply means for supplying an output from said signal processing means to said antenna.

2. The transmitting and receiving apparatus according to claim 1, wherein said signal processing means comprises a driver amplifier.

3. The transmitting and receiving apparatus according to claim 2, wherein said supply means includes a power amplifier means operating at timing based on said transmission enable signal.

4. The transmitting and receiving apparatus according to claim 3, wherein said frequency converting means operates at a timing based on said transmission enable signal.

5. The transmitting and receiving apparatus according to claim 1, wherein said delay means delays said transmission enable signal only when said transmission enable signal is changed from an inactive state to an active state.

6. The transmitting and receiving apparatus according to claim 1, wherein said frequency converting means is operated at a timing based on said transmission enable signal.

* * * * *